(12) United States Patent
Gensel et al.

(10) Patent No.: US 7,986,611 B1
(45) Date of Patent: Jul. 26, 2011

(54) HIGH-DENSITY OPTICAL RECORDING MEDIA AND METHOD FOR MAKING SAME

(75) Inventors: Lewis Gensel, Spring Brook, PA (US); Ed Pickutoski, Blakely, PA (US)

(73) Assignee: Cinram International Inc., Scarborough (CA)

( * ) Notice: Subject to any disclaimer, the term of this patent is extended or adjusted under 35 U.S.C. 154(b) by 568 days.

(21) Appl. No.: 11/726,968

(22) Filed: Mar. 22, 2007

(51) Int. Cl.
*G11B 7/24* (2006.01)
*G11B 7/26* (2006.01)

(52) U.S. Cl. .................... 369/275.4; 369/94; 369/275.5

(58) Field of Classification Search .................. None
See application file for complete search history.

(56) References Cited

U.S. PATENT DOCUMENTS

| | | |
|---|---|---|
| 4,995,799 A | 2/1991 | Hayashi et al. |
| 5,073,037 A | 12/1991 | Fujikawa et al. |
| 5,181,081 A | 1/1993 | Suhan |
| 5,247,494 A | 9/1993 | Ohno et al. |
| 5,303,224 A | 4/1994 | Chikuma et al. |
| 5,315,107 A | 5/1994 | Smith et al. |
| 5,457,746 A | 10/1995 | Dolphin |
| 5,540,966 A | 7/1996 | Hintz |
| 5,549,444 A | 8/1996 | Dubuit |
| 5,766,359 A | 6/1998 | Sichmann et al. |
| 5,766,495 A | 6/1998 | Parette |
| 5,792,538 A | 8/1998 | Yuresko-Suhan |
| 5,800,687 A | 9/1998 | Kempf |
| 5,801,464 A | 9/1998 | Brezoczky |
| 5,815,333 A | 9/1998 | Yamamoto et al. |
| 5,863,328 A | 1/1999 | Sichmann et al. |
| 5,863,399 A | 1/1999 | Sichmann |
| 5,900,098 A | 5/1999 | Mueller et al. |
| 5,905,798 A | 5/1999 | Nerlikar et al. |
| 5,913,653 A | 6/1999 | Kempf |
| 5,923,640 A | 7/1999 | Takemura et al. |
| 5,932,042 A | 8/1999 | Gensel et al. |
| 5,932,051 A | 8/1999 | Mueller et al. |
| 5,932,058 A | 8/1999 | Mueller |
| 5,935,673 A | 8/1999 | Mueller |
| 5,946,216 A | 8/1999 | Hollerich |
| 5,949,752 A | 9/1999 | Glynn et al. |
| 5,958,651 A | 9/1999 | Van Hoof et al. |
| 5,991,798 A | 11/1999 | Ozaki et al. |
| 5,995,481 A | 11/1999 | Mecca |
| 5,997,976 A | 12/1999 | Mueller et al. |
| 6,031,808 A | 2/2000 | Ueno |
| 6,035,329 A | 3/2000 | Mages et al. |
| 6,047,292 A | 4/2000 | Kelly et al. |
| 6,111,847 A | 8/2000 | Asadian |

(Continued)

OTHER PUBLICATIONS

White Paper Blu-ray Disc, 1.C Physical Format Specifications for BD-ROM, 3rd Edition, May 2005.

(Continued)

*Primary Examiner* — Wayne R Young
*Assistant Examiner* — Brian Butcher
(74) *Attorney, Agent, or Firm* — Cooper & Dunham LLP (57) ABSTRACT

The present disclosure provides a high-density optical storage medium which comprises a substrate structure having a thickness of 1.0 mm or more and including one or more information layers, a high-density information layer bonded via an adhesive spacer layer to the substrate structure, and a cover layer over the high-density information layer. The high-density information layer can be formed by transferring a reflective film to the substrate structure from a substrate formed of a material (such as polymethyl methacrylate) that does not bond well with the reflective film.

20 Claims, 5 Drawing Sheets

U.S. PATENT DOCUMENTS

| | | |
|---|---|---|
| 6,117,284 A | 9/2000 | Mueller |
| 6,124,011 A | 9/2000 | Kern |
| 6,136,133 A | 10/2000 | Maruyama et al. |
| 6,151,189 A | 11/2000 | Brooks |
| 6,160,787 A | 12/2000 | Marquardt, Jr. et al. |
| 6,195,693 B1 | 2/2001 | Berry et al. |
| 6,212,158 B1 | 4/2001 | Ha et al. |
| 6,222,800 B1 | 4/2001 | Miller et al. |
| 6,261,403 B1 | 7/2001 | Gerigk et al. |
| 6,309,496 B1 | 10/2001 | Van Hoof |
| 6,309,727 B1 | 10/2001 | Mueller et al. |
| 6,317,407 B1 | 11/2001 | Takemura et al. |
| 6,317,779 B1 | 11/2001 | Gile et al. |
| 6,321,649 B1 | 11/2001 | Vangen et al. |
| 6,341,375 B1 | 1/2002 | Watkins |
| 6,355,896 B1 | 3/2002 | Cresgy |
| 6,361,845 B1 | 3/2002 | Kern |
| 6,368,435 B1 | 4/2002 | Kempf |
| 6,396,798 B1 | 5/2002 | Takemura et al. |
| 6,416,609 B1 | 7/2002 | Imada et al. |
| 6,418,111 B1 | 7/2002 | Takemura et al. |
| 6,438,232 B1 | 8/2002 | Mages et al. |
| 6,440,248 B1 | 8/2002 | Mueller |
| 6,480,462 B2 | 11/2002 | Ha et al. |
| 6,527,538 B1 | 3/2003 | Pickutoski et al. |
| 6,537,423 B1 | 3/2003 | Ebisawa et al. |
| 6,564,255 B1 | 5/2003 | Mobini et al. |
| 6,580,683 B1 | 6/2003 | Braitberg et al. |
| 6,587,424 B2 | 7/2003 | Kuroda et al. |
| 6,628,603 B1 | 9/2003 | Kam et al. |
| 6,636,462 B1 | 10/2003 | Drynkin et al. |
| 6,678,237 B1 | 1/2004 | Edwards et al. |
| 6,725,258 B1 | 4/2004 | Bick et al. |
| 6,726,973 B2 | 4/2004 | Mueller |
| 6,814,826 B2 | 11/2004 | Becker et al. |
| 6,820,325 B2 | 11/2004 | Gieskes et al. |
| 6,896,829 B2 | 5/2005 | Kern et al. |
| 7,026,030 B2 | 4/2006 | Itoh et al. |
| 7,092,320 B1 | 8/2006 | Lee et al. |
| 7,325,287 B2 | 2/2008 | Sweeney |
| 7,419,045 B2 | 9/2008 | Kelsch |
| 7,535,806 B2 | 5/2009 | Fumanti |
| 7,564,771 B2 | 7/2009 | Sweeney |
| 2001/0042111 A1 | 11/2001 | Douzono |
| 2002/0009022 A1 | 1/2002 | Britz et al. |
| 2003/0002400 A1 | 1/2003 | Klein |
| 2003/0229679 A1 | 12/2003 | Yoo et al. |
| 2004/0002018 A1* | 1/2004 | Oishi et al. ............... 430/270.13 |
| 2004/0044900 A1 | 3/2004 | Wang et al. |
| 2004/0134603 A1 | 7/2004 | Kobayashi et al. |
| 2004/0184390 A1 | 9/2004 | Oishi |
| 2004/0213116 A1* | 10/2004 | Arai ........................... 369/53.23 |
| 2004/0264361 A1 | 12/2004 | Kondo |
| 2005/0031778 A1 | 2/2005 | Inoue |
| 2005/0039675 A1 | 2/2005 | Kang et al. |
| 2005/0042371 A1 | 2/2005 | Ushida et al. |
| 2005/0048250 A1 | 3/2005 | Yamaga et al. |
| 2005/0052985 A1 | 3/2005 | Senshu et al. |
| 2005/0053728 A1 | 3/2005 | Komaki |
| 2005/0053752 A1 | 3/2005 | Komaki |
| 2005/0072336 A1 | 4/2005 | Itoh et al. |
| 2005/0072518 A1 | 4/2005 | Komaki et al. |
| 2005/0109454 A1 | 5/2005 | Katoh et al. |
| 2005/0112319 A1 | 5/2005 | Itoh et al. |
| 2005/0132395 A1 | 6/2005 | Hisada et al. |
| 2005/0147809 A1 | 7/2005 | Hongo et al. |
| 2005/0158504 A1 | 7/2005 | Itoh et al. |
| 2005/0170132 A1* | 8/2005 | Nee .............................. 428/64.4 |
| 2005/0175771 A1 | 8/2005 | Hisada |
| 2006/0023598 A1 | 2/2006 | Babinski et al. |
| 2006/0101634 A1 | 5/2006 | Sweeney |
| 2006/0104190 A1 | 5/2006 | Babinski |
| 2006/0165419 A1 | 7/2006 | Musto |
| 2006/0179448 A1 | 8/2006 | Smith et al. |
| 2006/0181706 A1 | 8/2006 | Sweeney |
| 2006/0222808 A1 | 10/2006 | Pickutoski et al. |
| 2006/0270080 A1 | 11/2006 | Rinaldi |
| 2006/0274617 A1 | 12/2006 | Musto et al. |
| 2007/0008861 A1 | 1/2007 | Fumanti |
| 2007/0014224 A1 | 1/2007 | Sweeney |
| 2007/0029167 A1 | 2/2007 | Kelsch |
| 2007/0090006 A1 | 4/2007 | Kelsch |
| 2007/0098947 A1 | 5/2007 | Mueller |
| 2007/0263524 A1* | 11/2007 | Thompson et al. ......... 369/275.1 |
| 2009/0262623 A1* | 10/2009 | LeBlanc et al. ................ 369/94 |

OTHER PUBLICATIONS

White Paper Blu-ray Disc, 1.C Physical Format Specifications for BD-ROM, 4$^{th}$ Edition, Nov. 2005.
U.S. Appl. No. 11/705,682, filed Feb. 13, 2007.
U.S. Appl. No. 11/715,249, filed Mar. 6, 2007 corresponding to.
U.S. Appl. No. 60/781,085, filed Mar. 9, 2007.
U.S. Appl. No. 11/705,682, filed Feb. 13, 2007 of Michael Parette.
U.S. Appl. No. 11/715,249, filed Mar. 6, 2007 of William R. Mueller et al.
U.S. Appl. No. 11/936,625, filed Nov. 7, 2007 of Petrus Hubertus Van Hoof et al.
U.S. Appl. No. 11/938,572, filed Nov. 12, 2007 of Dominick A. Dallaverde et al.
U.S. Appl. No. 12/126,667, filed May 23, 2008 of Ed Pickutoski.
U.S. Appl. No. 12/567,886, filed Sep. 28, 2009 of James J. Musto et al.

* cited by examiner

S58

HIGH-DENSITY OPTICAL RECORDING MEDIA AND METHOD FOR MAKING SAME

TECHNICAL FIELD

This disclosure relates to high-density optical storage media, and more specifically an approach for manufacturing such a high-density optical storage medium by adding a high-density information layer to an optical recording medium with one or more information layers.

DESCRIPTION OF RELATED ART

Use of CDs (compact discs) and DVDs (digital versatile discs or digital video discs) as optical storage media ("optical disc") for storing and transporting content (such as audio, video, graphics, computer software, etc.) in an optically readable manner has been popular for a number of years. Several formats of optical discs are currently available, including (A) read-only formats such as CD-DA (digital audio compact disc), CD-ROM (CD-read-only memory), DVD-ROM, and other formats wherein content is pre-recorded on the disc (such as by using an injection molding process), and (B) recordable formats in the form of (i) write-once read-many times formats such as CD-R (CD-recordable), and DVD±R (DVD-recordable), etc., or (ii) rewritable formats such as CD-RW (CD-rewriteable), DVD-RAM (DVD-Random Access Media), DVD-RW or DVD+RW (DVD-rewriteable), PD (Phase change Dual disk) and other phase change optical discs. Optical disc players for these optical discs use a red laser (with a wavelength range of 635 nm to 660 nm in the case of DVD and a wavelength of approximately 780 nm in the case of CD).

Optical discs using a blue laser (with a wavelength range of 400 nm to 420 nm) have also been introduced, such as HD DVD and BD (each of which includes read-only, recordable and rewritable formats). The popularity of optical storage media driven by advancements in computer, information communication and multimedia technologies has been accompanied also by demands for higher density and greater capacity of optical storage media. HD DVD and BD provide high density formats directed to such demands.

In conventional read-only type optical discs (for example, CD-ROM, DVD-ROM, etc.), data is generally stored as a series of "pits" embossed in a plane of "lands". Microscopic pits formed in a surface of a plastic medium [for example, polycarbonate or polymethyl methacrylate (PMMA)] are arranged in tracks, conventionally spaced radially from the center hub in a spiral track originating at the medium center hub and ending toward the medium's outer rim. The light reflected from a read-only medium's surface by an optical disc player or reader varies according to the presence or absence of pits along the information track. A photodetector and other electronics inside the optical disc player translate the signal from the transition points between these pits and lands into a digital signal of 0s and 1s representing the stored information.

Read-only type optical discs generally are produced by an injection molding process. For example, data representing the content to be recorded, encoded as a run length limited digital code (such as commonly known as an EFM signal in CD manufacturing) which contains its digital information in the timing between transitions, is used in a mastering process to control a laser beam recorder to form pits in a photoresist or a dye-polymer layer on an optical grade glass disc known as a glass master. A metallized glass master is used in an electroforming process to form (typically, metal) stampers. A stamper is used on one side of an injection molding cavity to emboss a layer of pits and lands on a transparent polymer substrate formed by injection molding. The information bearing surface of the substrate is then covered with a reflective film (of metal or alloy) or the like, to form an information layer. In the case of a CD, a plastic protective coating is applied over the reflective film, and then art (for example, a picture, design, text, etc.) is typically printed on the upper surface of the disc (that is, on the side of the substrate which bears the information layer), to form an end product which is approximately 1.2 mm thick. In the case of DVDs, two half-thickness substrates (that is, approximately 0.6 mm each) are typically formed, metallization is applied to one (for example, DVD-5) or both (for example, DVD-10, DVD-9, DVD-18) half-thickness substrates, and the two half-thickness substrates are bonded by an adhesive (for example, hot-melt adhesive, ultraviolet light-cured adhesive, etc.), with the information layer being shielded from the external environment by the half-thickness substrates as cover layers. A second information layer can be formed in each half-thickness substrate (for example, DVD-18) by applying a photo-polymer coating over a metallization layer applied to a half-thickness substrate (prior to bonding) and the second information layer is embossed by a stamper into the photo-polymer layer which is then UV cured, metallized and protective coated. Thus, the information layers in such conventional DVD discs are typically in the middle of the disc, sandwiched between half-thickness substrates.

Recordable type optical media typically include a spiral wobble groove in the substrate. The groove defines recording channels on the disc for recording data, provides information for tracking of the disc while writing or reading data, and has its wobble frequency modulated to contain addressing and other information for the write and read processes. The substrate (including information layer bearing the spiral wobble groove) can be formed by injection molding, using a stamper electroformed with a glass master. In addition, recordable-type optical media generally include at least a recording layer, and in addition a reflective layer (of metal or alloy) and a protective layer. Information is recorded in the recordable-type optical medium by directing a laser light beam modulated by signals to selectively change optical characteristics (reflectivity or extinction coefficient) of the recording layer. The recording layer in write-once read-many times optical media typically includes a photosensitive organic dye which is heated during recording to form irreversibly a pattern of marks or pits in the recording layer.

Each recording side of a rewritable disc also uses multiple layers beginning with a polycarbonate plastic substrate containing a shallow spiral groove extending from the inside to the outside diameter of the disc. A DVD-RW disc may additionally include pits and lands and a DVD-RAM disc also inside the groove itself. The substrates (including information layer bearing the spiral groove, land pre-pits and embossed areas) may be formed by injection molding, using a stamper electroformed with a glass master. Next in the multiple layers of a rewritable disc typically comes a dielectric layer, followed by a phase-change type recording layer having a polycrystalline structure, another dielectric layer and a reflective layer (of metal or alloy). Additional layers may also be incorporated above or below the dielectric layer, with a protective coating being applied as a last layer in single-sided optical media. During recording of the rewritable optical medium, the laser selectively heats tiny areas of the recording track to change the phase of each heated area from more crystalline into less crystalline (also known as "amorphous") phase, in order to create marks that can be called "pits" (the term "pit"

is used broadly herein to cover, for example, a pit in a read-only type optical disc, and a pit or mark in a recordable or rewritable optical disc). During erase, the laser (in a process called "annealing") changes the amorphous areas back into more crystalline areas.

Some exemplary optical disc manufacturing techniques (including methods, systems and apparatuses) are discussed in U.S. Pat. Nos. 5,181,081, 5,315,107, 5,766,495, 5,792,538, 5,900,098, 5,932,042, 5,932,051, 5,932,058, 5,935,673, 5,949,752, 5,958,651, 5,995,481, 5,997,976, 6,117,284, 6,124,011, 6,160,787, 6,309,496, 6,309,727, 6,361,845, 6,440,248, 6,527,538, 6,726,973 and 6,896,829, which are incorporated by reference herein in their entireties in order to more fully describe the state of the art as of the date of the subject matter described and claimed herein. Additional exemplary techniques are discussed in U.S. Pat. Nos. 4,995,799, 5,766,359, 5,800,687, 5,863,328, 5,863,399, 5,913,653, 6,261,403, 6,368,435 and 6,814,825, which are also incorporated by reference herein in their entireties.

HD DVD format discs can be replicated using a process similar to the process for forming a DVD disc, except that the minimum pit length is shorter and therefore the laser beam recorder used in the mastering process must be adapted to form the shorter pits. The information surface of an HD DVD format disc is 0.6 mm below the surface of the disc, similar to DVD discs.

BD format discs are typically manufactured by injection molding a 1.1 mm substrate bearing pits and sputtering a reflective film over the pits to form an information layer, and applying a transparent cover layer over the information layer.

Sanyo Corp of Japan has announced development of a BD/DVD disc wherein the DVD layer which resides a nominal 0.6 mm below the surface is read through the BD layer. This process and construction contains several significant issues. In order to read the DVD layer the BD layer must be coated with a special reflective film able to be reflective to the BD read laser and simultaneously be transparent to the DVD read laser. The optical properties including the clarity and birefringence of the BD disc substrate and the bonding adhesive for such a multi-format disc must be carefully (in comparison to a "BD only" disc) controlled in order to read the DVD layer. This requirement significantly reduces yield and increases cost. Since both information surfaces in this disc must be read from one side of the disc, the BD player must contain a more sophisticated method of interpreting which surface to play upon disc introduction.

There is a need for an improved approach for manufacturing high-density optical storage media which largely utilizes existing optical disc manufacturing equipment.

SUMMARY

This disclosure provides methodologies for manufacturing a high-density optical storage medium utilizing largely existing optical disc manufacturing equipment. In one embodiment, a method for manufacturing a high-density optical storage medium includes (a) forming a first substrate structure including a first substrate having a first surface including a pattern of pits and/or lands thereon and a reflective film over the first surface of the first substrate, (b) forming a second substrate structure having a thickness of 1.0 mm or more and including one or more information layers, the second substrate structure further including a first side through which information on the one or more information layers is not read and a second side through which the information on the one or more information layers is read, (c) depositing an adhesive layer on the first side of the second substrate structure, (d) bonding the first substrate structure and the second substrate structure together, with the first surface of the first substrate structure including the pattern of pits and/or lands thereon over which the reflective film is formed adhering via the adhesive to the first side of the second substrate structure, (e) separating the first substrate from the second substrate structure, with the reflective film remaining adhered to the second substrate structure as an additional information layer, and (f) then forming a cover layer over the reflective film.

To achieve the transfer of the reflective layer from the first substrate structure to the second substrate structure, the first substrate is preferably made of a material, such as polymethyl methacrylate (PMMA), that does not bond well to the reflective layer and/or adheres to the reflective film only through molecular roughness.

Using the methodologies of this disclosure, high-density optical storage medium can be manufactured at faster rates than when techniques proposed by others for manufacturing high-density discs are applied. Also, the optical storage medium manufactured in accordance with the methodologies provided in this disclosure does not have the additional complexities (in manufacturing or reading) that are present in other proposed approaches.

A high-density optical storage medium, in accordance with an exemplary embodiment of the subject matter of this disclosure, can comprise a substrate structure including one or more information layers and having a thickness of approximately 1.0 mm, and an additional (high-density) information layer including a reflective film alloy bonded via an adhesive layer to the substrate structure. In addition, a cover layer is formed over the additional information layer. The optical storage medium including the cover layer, additional information layer and the substrate structure together typically have a combined thickness in a range of 1.1 mm to 1.4 mm. Read out of the additional high-density information layer is from a first side of the recording medium. Read out from one or additional information layers of the same or second high density format, or another standard read-only or recordable format, can be from a second side of the optical storage medium.

BRIEF DESCRIPTION OF THE DRAWINGS

The features of the present application can be more readily understood from the following detailed description with reference to the accompanying drawings wherein.

DETAILED DESCRIPTION

This patent specification describes methodologies for manufacturing a high-density optical storage medium that includes a high-density information layer and one or more additional information layers, with minimal modification of existing optical disc manufacturing equipment. In such a high-density optical storage medium, a substrate structure includes the additional information layers, and the high-density information layer including a reflective film is bonded via an adhesive layer to the non-read side of the substrate structure, with an additional 0.1 mm cover layer formed over the reflective film of the high-density information layer, to form the high-density optical storage medium.

The term "substrate" is used generally in this disclosure to refer to an injection molded disc (such as polycarbonate resins, acrylic resins, polyolefin resins, another plastic material, glass, ceramics, and the like). The term "substrate structure" is used to refer to a substrate or two half-disc substrates bonded to each other, with one or more information layers, and with or without coatings on the substrate.

The term "high-density" is used generally in this disclosure to refer to an information layer, or a storage medium including at least one information layer, having information capacity of 15 GB or greater.

The term "double-sided" is used generally in this disclosure to refer to optical discs with two opposite facing readout surfaces. Information can be read through one readout surface from one or more corresponding information layers, and can be read through the other readout surface from one or more other information layers. This is to be distinguished from a "single-sided" optical disc in which all information on the disc must be read through the same surface of the disc.

As an example (FIG. 1) of the subject matter of this specification, a high-density optical storage medium 10 comprises a cover layer 11, high-density information layer 15 (comprised of a reflective film 12 over an adhesive layer 13), and a substrate structure 14 that can include one or more information layers 14a and 14b. The cover layer 11 is over a first surface of the reflective film 12, and a second surface of the reflective film 12 is bonded via the adhesive layer 13 to the non-read surface of the substrate structure 14. An optional hardcoat 18 may be formed over the cover layer 11. The high-density information layer 15 can be read with light (illustrated with the triangular-shaped laser beam) reflected from a first read-out surface of the optical storage medium 10 while the information layers 14a and 14b of the substrate structure 14 can be read through the second read-out surface of the optical storage medium 10.

Figure 1:
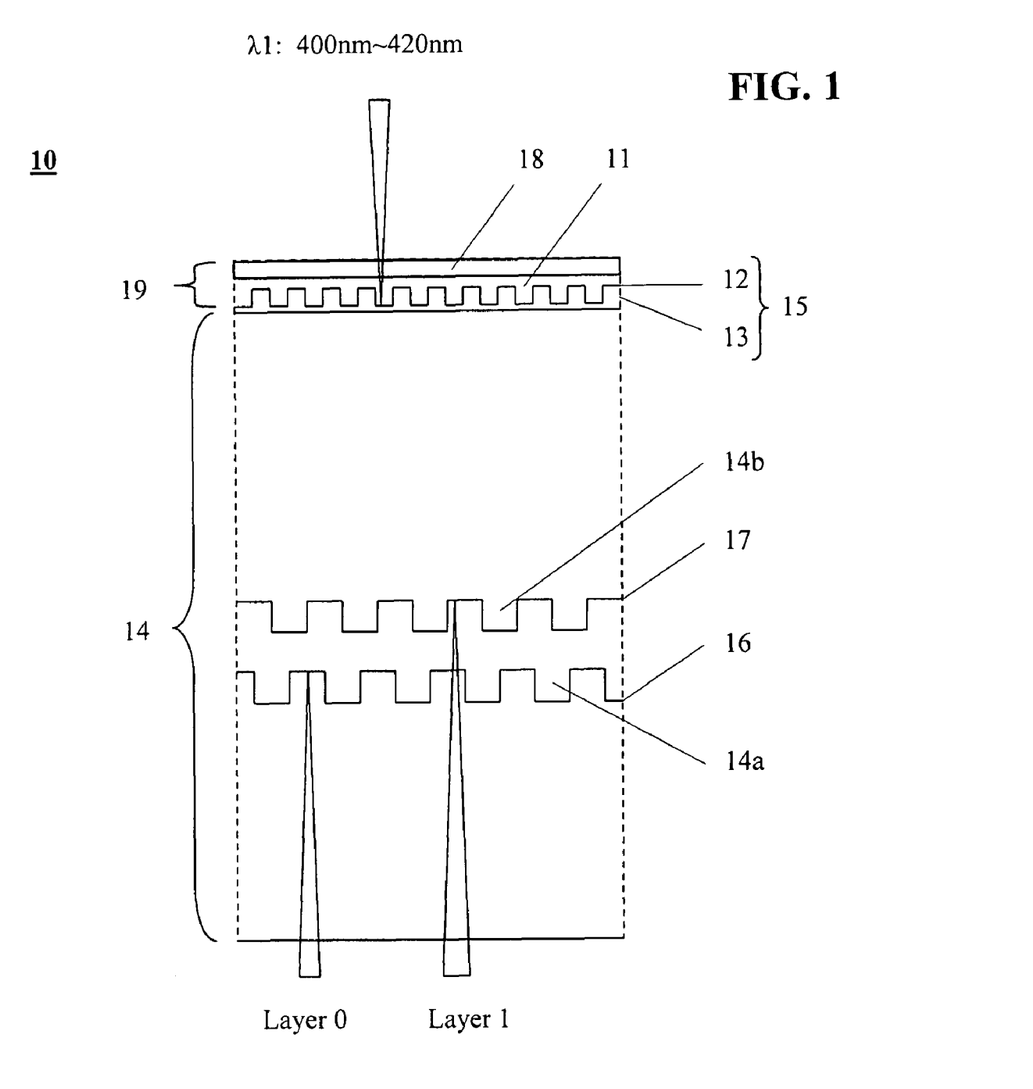
FIG. 1 shows a partial cross-sectional view of a portion of an optical storage medium, according to an exemplary embodiment of the present disclosure.

The high-density information layer 15 can be configured to include a series of pits in a plane of land, all of which being covered by the reflective film 12. Reflective film 12 can be comprised of a metal or metal-alloy (for example, silver or silver-based alloy). In one example, the information layer 15 comprises an information track having pits with a minimum length along the track in a range of 138 nm to 160 nm. The information layer 15 can be configured to comprise information marks configured for reading using a laser with a wavelength in a range of 400 nm to 420 nm and a numerical aperture of 0.85. The information layer 15 with such configurations can have information capacity of 23 GB or more.

The cover layer 11 is made of a light transmissive or transparent material (for example, radiation curable resin), and may be formed by utilizing any of various methodologies. For example, the light transmitting cover layer may be formed by a spin coating technique. See for example, U.S. Patent Application Publication No. US2005/0109454A1 (the entire contents of which are incorporated by reference herein).

Protective hardcoat 18 which has properties of scratch resistance and abrasion resistance is preferably formed over cover layer 11. Hardcoat 18 may be formed by applying a hardcoat agent composition (for example, UV hardening resin) on cover layer 11, followed by curing through irradiation with active energy rays such as ultraviolet rays, electron rays or visible rays. Examples of a hardcoat composition and techniques for applying the composition are described in U.S. Patent Application Publication Nos. US2005/0072336A1, US2005/0112319A1 and US 2005/0158504A1, the entire disclosures of which are incorporated by reference herein. In another example, a hardcoat film including the cover layer and the hardcoat may be formed and then the hardcoat film is bonded on the information layer. See, for example, U.S. Patent Application Publication No. US2005/0147809A1 (the entire contents of which are incorporated by reference herein).

In addition, while FIG. 1 shows an example of a single information layer 15 (and the cover layer 11 in such example is approximately 0.1 mm or 100µ thick), in other examples multiple information layers 15 may be included, each formed by applying the methodologies of this disclosure (and the additional high-density information layers 15 would be formed with semi-reflective films in place of the reflective film). In such examples in which multiple information layers 15 are formed (not shown), adjacent information layers 15 are separated by a space layer (not shown). The collection of information layer(s) 15, cover layer 11, hardcoat 18 and any space layers forms a transmission stack 19 having a thickness of approximately 0.1 mm (substantially constituted by the cover layer and any space layers). Accordingly, in an example in which two information layers 15 and a 0.025 mm space layer are included in the transmission stack, the cover layer 11 has a thickness of approximately 0.075 mm.

The substrate structure 14 has a thickness in a range of 1.0 mm to 1.3 mm. Therefore, the optical storage medium including the transmission stack 19 and the substrate structure 14 has a thickness in a range of 1.1 to 1.4 mm.

As described above, the substrate structure 14 can include one information layer or multiple information layers. In the case of the substrate structure 14 having information layers 14a and 14b, information layer 14a (which is closer to the read-surface of the substrate structure 14) is covered by a semi-reflective film 16 (for example, gold, silicon, silver, alloy, etc.) and information layer 14b (which is further from the read-surface of the substrate structure 14) is covered by a reflective film 17 (for example, aluminum, etc.). Each information layer in the substrate structure 14 can be selected to comply with read-only or recordable CD, DVD and/or HD-DVD formats.

Figure 2A:
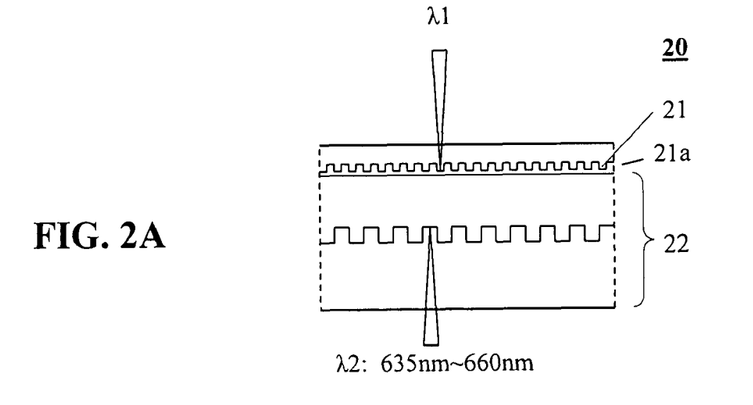
FIG. 2A shows a similar cross-sectional view of a portion of a high-density optical storage medium, according to an exemplary embodiment, comprising a high-density information layer bonded to a DVD-5 format substrate structure.
Figure 2B:
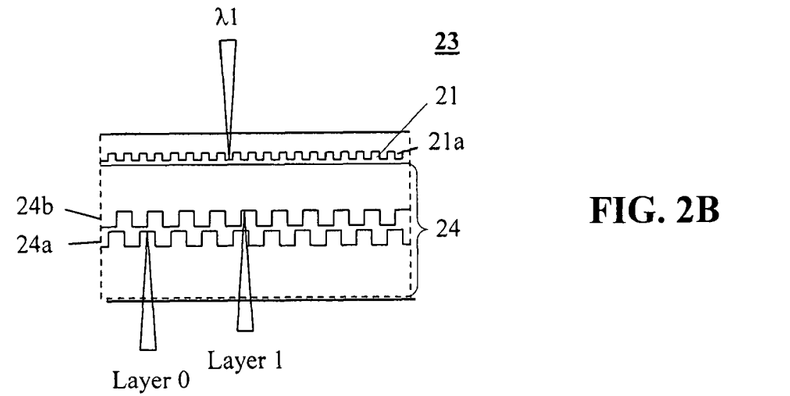
FIG. 2B shows a similar cross-sectional view of a portion of a high-density optical storage medium, according to an exemplary embodiment, comprising a high-density information layer bonded to a DVD-9 format substrate structure.

For example (FIG. 2A), in optical storage medium 20, a DVD-5 substrate structure 22 (single information layer) is bonded to a high-density information layer 21 via an adhesive layer 21a. In another example (FIG. 2B), a DVD-9 substrate structure 24 (dual information layers) is bonded to the high-density information layer 21 via an adhesive layer 21a. Each information layer of substrate structures 22 and 24 can have information capacity of approximately 4.7 GB and 8.54 GB, respectively, and information track comprising pits having a minimum length of approximately 400 nm and 440 nm, respectively. Further, each information layer in the substrate structures 22 and 24 can comprise information marks configured for reading using a laser with a wavelength in a range of 635 nm to 660 nm and a numerical aperture of 0.6.

Figure 2C:
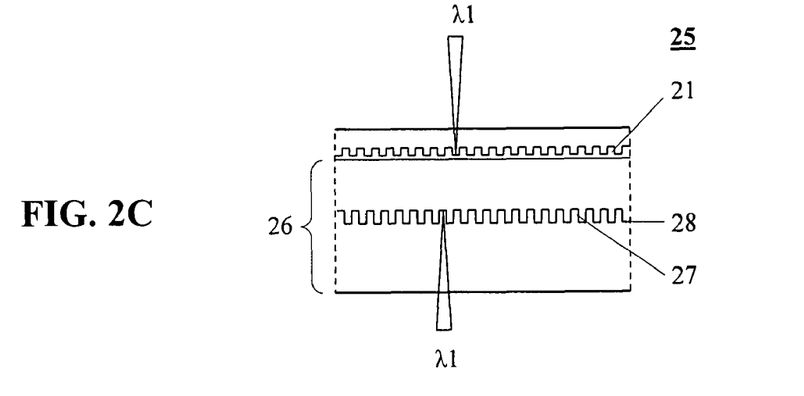
FIG. 2C shows a similar cross-sectional view of a portion of a high-density optical storage medium, according to an exemplary embodiment, comprising a high-density information layer bonded to a HD-DVD format substrate structure.

In another example (FIG. 2C), a HD DVD substrate structure 26 including a high-density information layer 27 comprising a reflective film 28 is bonded to the high-density information layer 21. The high-density information layer 27 of substrate structure 26 can have information capacity of 15 GB or more, and an information track comprising pits having a minimum length of approximately 204 nm. Further, the high-density information layer 27 can comprise information marks configured for reading using a laser with a wavelength in a range of 400 nm to 420 nm, and a numerical aperture of 0.65.

Figure 3:
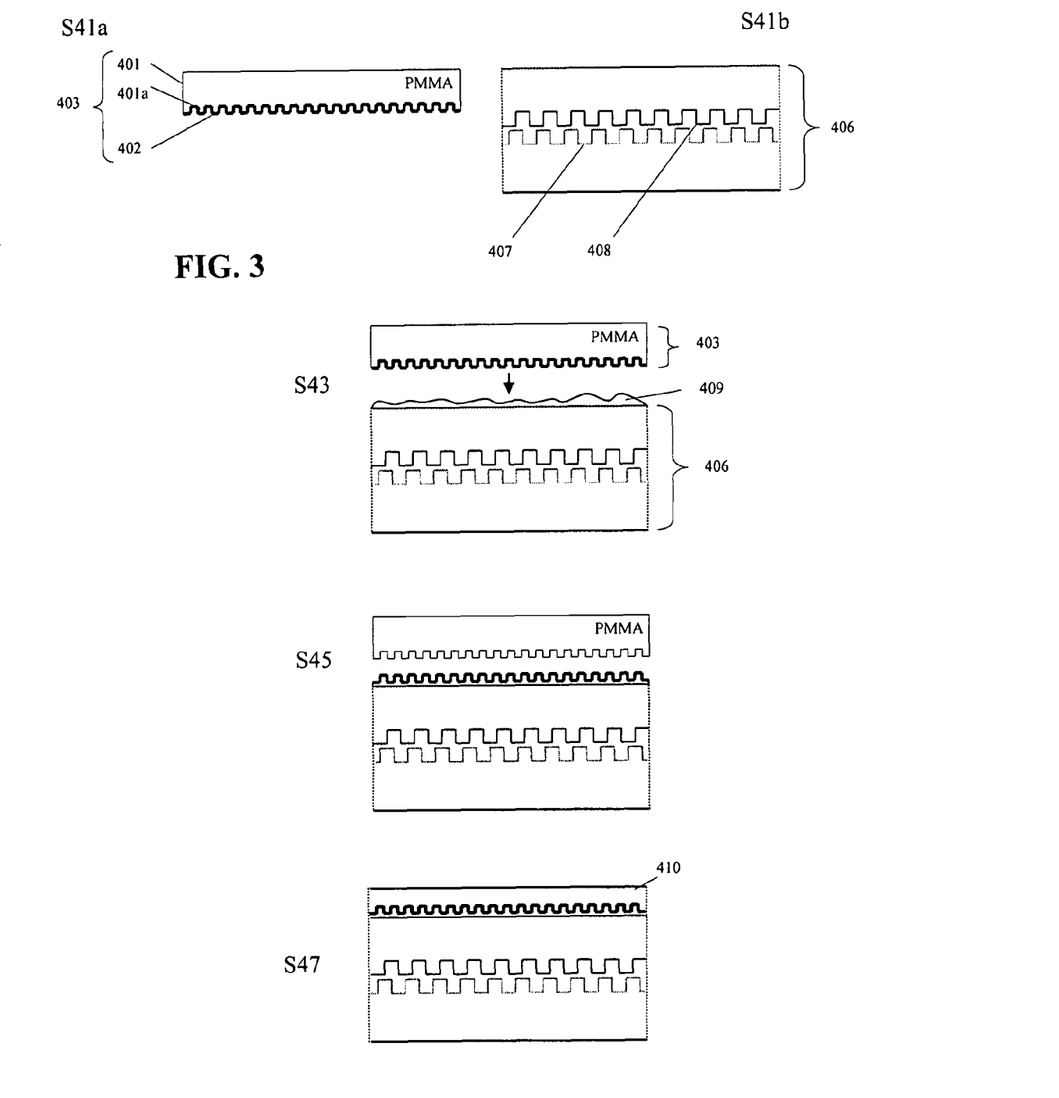
FIG. 3 graphically illustrates an example of a process for manufacturing an optical storage medium consisting of a BD format information layer plus a DVD-9 format substrate structure.

A method, according to one exemplary embodiment, for making a high-density optical storage medium comprising a high-density information layer bonded to a substrate structure that includes one or more information layers is shown graphically in FIG. 3. The method illustrated in FIG. 3 includes forming a substrate structure 403 including a substrate 401 and a pattern 401a of pits of land on a surface of the substrate 401 (step 41a). The substrate 401 preferably comprises polymethyl methacrylate (PMMA) material, since a characteristic of PMMA is that it does not bond to most metallic layers (for example, aluminum), and adhesion of such metallic layers to PMMA is only through molecular roughness. The PMMA substrate 401 including the pattern 401a of pits and lands on the surface of the substrate can be molded through a conventional injection molding process. A reflective film 402 can then be formed (for example, by a sputtering technique) over the pattern 401a of pits and lands on the surface of the substrate 401, and thereby form the substrate structure 403.

In addition, a second substrate structure 406 having a thickness of 1.0 mm or more, comprising one or more additional information layers 407 and 408, is formed (step 41b). Techniques for forming single and dual-layer substrate structures (that is, both information layers being readable from the same readout surface of a disc), described above, is well-understood (for example, U.S. Pat. No. 6,117,284 and U.S. Patent Application Publication Nos. US2005/0002018A1 and US2005/0072518A1, the entire disclosures of which are incorporated by reference herein), and therefore in the interest of clarity with respect to the inventive aspects of the subject matter of this specification, a detailed discussion of such techniques is omitted. However, it should be noted that formation of the substrate structure 406 typically occurs independent of the formation of the substrate structure 403.

A light-curable resin 409 is deposited on the non-read surface of the substrate structure 406. The substrate structure 403 is positioned so that the exposed side of reflective film 402 faces the non-read surface of the substrate structure 406 on which the light-curable resin 409 was deposited. When the two substrate structures are brought together (step S43), radiation is applied to the light-curable resin to form an adhesive bonding layer 409 resulting in the transfer of reflective film 402 from the substrate structure 403 to adhesive bonding layer 409. The light-curable resin used in the adhesive bonding layer 409 can further be designed to adhere to the reflective film 402 of the substrate structure 403.

Upon transfer of reflective film 402, the substrate 401 is separated from the remaining structure (step S45). Reflective film 402 remains with the substrate structure 406 and adhesive bonding layer 409.

The method may additionally include applying (step S47) a cover layer 410 over the surface of the light incident surface of reflective film 402 and optionally a protective coating (not shown) over cover layer 410.

Figure 4A:
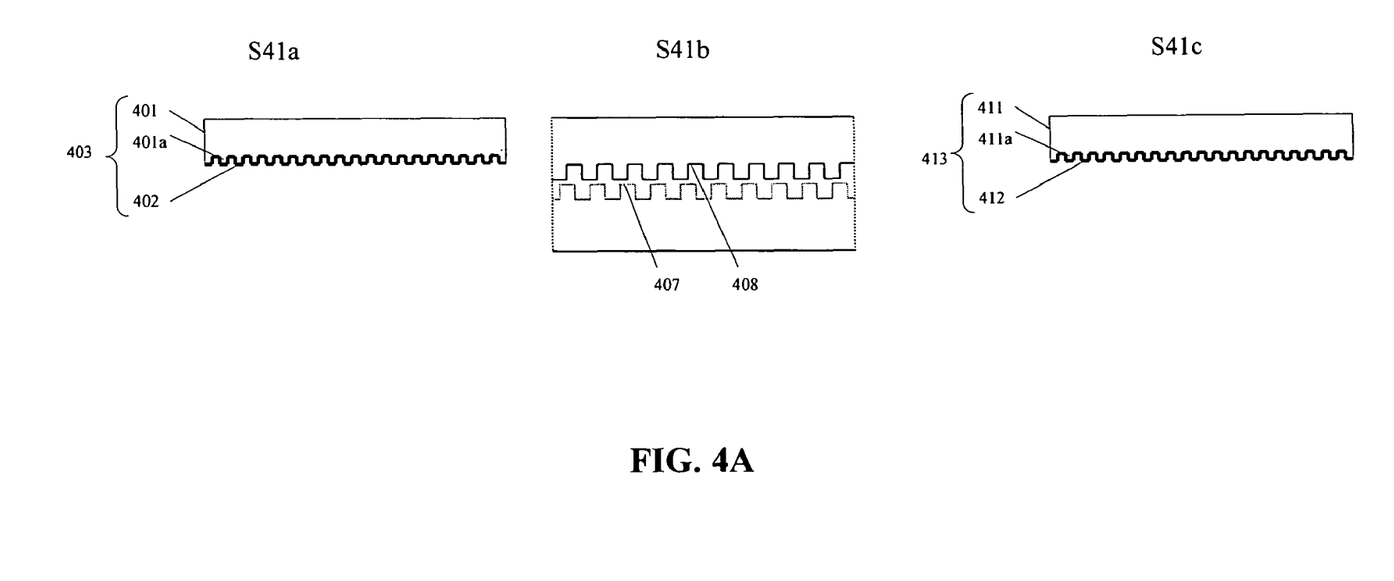
FIGS. 4A and 4B graphically illustrate another example of a process for manufacturing an optical storage medium consisting of two BD format information layers plus a DVD-9 format substrate structure.
Figure 4B:
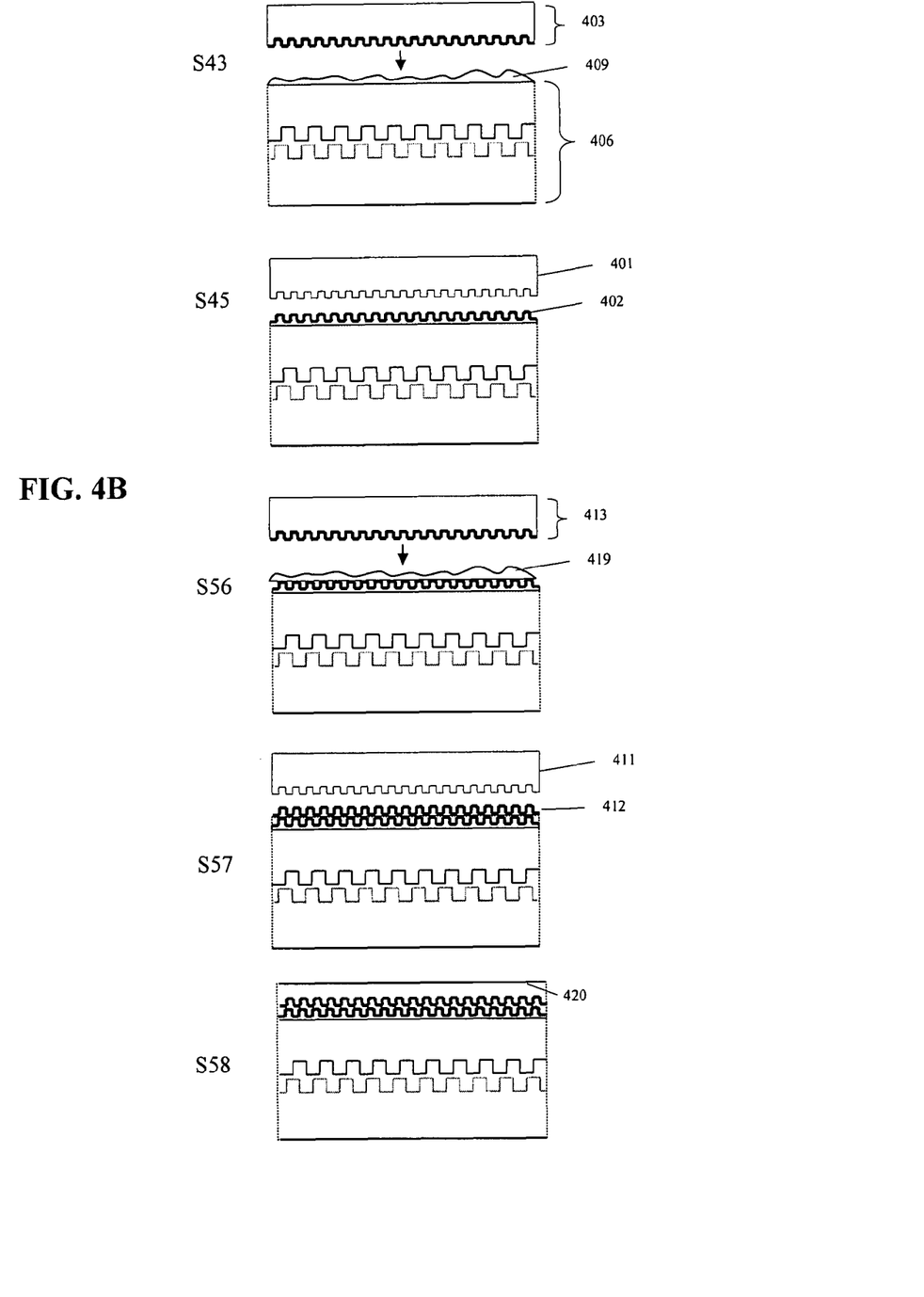

A method for making a high-density optical storage medium, in another exemplary embodiment (FIGS. 4A and 4B), includes adding two high-density information layers to a substrate structure that includes one or more other information layers. The method shown in FIGS. 4A and 4B is similar to the method shown in FIG. 3, except that (a) step S41c for forming a substrate structure 413 including a substrate 411 and a pattern 411a of pits or land on a surface of the substrate 411 (similar to step S41a) is performed concurrently with steps 41a and 41b, and (b) steps S56 through S58 replace step S47, to add an additional high-density information layer 412 (like the high-density information layer 402 added via steps S43 and S45).

In describing examples and exemplary embodiments, specific terminology is employed for the sake of clarity in this disclosure. However, the disclosure of this patent specification is not intended to be limited to the specific terminology so selected and it is to be understood that each specific element includes all technical equivalents that operate in a similar manner.

In addition, the embodiments and examples above are illustrative, and many variations can be introduced on them without departing from the spirit of the disclosure or from the scope of the appended claims. For example, elements and/or features of different illustrative and exemplary embodiments herein may be combined with each other and/or substituted for each other within the scope of this disclosure.

Further, in the discussion above, read-only format information layers are posed as examples. It should be apparent after a reading of this patent disclosure, however, that the techniques of this disclosure apply similarly to recordable (write once read many times) and rewritable format information layers.

What is claimed is:

1. A method for manufacturing an optical recording medium including a high-density information layer, said method comprising the steps of:
    (a) forming a first substrate structure including a first substrate having a first surface including a pattern of pits and lands thereon and a reflective film over said first surface of said first substrate, said first substrate being formed of a material that does not bond well with said reflective film;
    (b) forming a second substrate structure having a thickness of 1.0 mm or more and including one or more information layers, said second substrate structure further including a non-read side from which information in the second substrate structure is not read and a read side from which said information in the second substrate structure is read;
    (c) depositing an adhesive layer on said non-read side of said second substrate structure;
    (d) bonding said first substrate structure and said second substrate structure together, with said first surface of said first substrate structure including said pattern of pits and lands thereon over which said reflective film is formed adhering via the adhesive to the non-read side of said second substrate structure;
    (e) separating said first substrate from said second substrate structure, with said reflective film remaining adhered to said second substrate structure as an additional information layer, said additional information layer remaining adhered to said second substrate structure having information capacity of 23 GB or more and comprising an information track having pits with a minimum length along the track in a range of 138 nm to 160 nm, and information marks configured for reading using a laser with a wavelength in a range of 400 nm to 420 nm and a numerical aperture of 0.85 from a direction opposite said read side of said second substrate structure; and (f) forming a cover layer over said reflective film.

2. The method as claimed in claim 1, further comprising (g) forming a third substrate structure including a third substrate having a first surface including a pattern of pits and lands thereon and a semi-reflective film over said first surface of said third substrate; and (h) repeating steps (c) through (e), before step (f), to transfer said semi-reflective film onto said second substrate structure as a further high-density information layer above said additional information layer.

3. The method as claimed in claim 2, wherein the adhesive between said further high-density information layer and said additional information layer is comprised of a light-curable resin, and further comprising the step of applying radiation after said third and second substrate structures are bonded together via the adhesive, to cure the adhesive to form a space layer.

4. The method as claimed in claim 2, wherein a transmission stack including said cover layer, said further high-density information layer, a space layer and said additional information layer has a thickness of approximately 0.1 mm.

5. The method as claimed in claim 1, wherein said adhesive deposited in step (c) is a light-curable resin, and further comprising the step of applying radiation after said first and second substrate structures are bonded together in step (d) via the adhesive.

6. The method as claimed in claim 1, wherein said cover layer formed over said reflective film in step (f) has a thickness of approximately 0.1 mm or less.

7. The method as claimed in claim 1, wherein said one or more information layers in said second substrate structure formed in step (b) includes at least one information layer having at least one of (1) an information track comprising pits having a minimum length of approximately 204 nm, and (2) information marks configured for reading using a laser with a wavelength in a range of 400 nm to 420 nm and a numerical aperture of 0.65.

8. The method as claimed in claim 1, wherein said one or more information layers in said second substrate structure formed in step (b) includes at least one information layer having information capacity of 15 GB or more.

9. The method as claimed in claim 1, wherein said one or more information layers in said second substrate structure formed in step (b) includes at least one information layer having an information track comprising pits having a minimum length in a range of 400 nm to 440 nm.

10. The method as claimed in claim 1, wherein said one or more information layers in said second substrate structure formed in step (b) includes at least one information layer comprising information marks configured for reading using a laser with a wavelength in a range of 635 nm to 660 nm and a numerical aperture of 0.6.

11. An optical storage medium comprising:

a substrate structure having a thickness of 1.0 mm or more and including one or more information layers separated from a read side of said substrate structure from which information in said substrate structure is read by approximately 0.6 mm;

an additional information layer including a reflective film bonded via an adhesive layer to a non-read side of said substrate structure from which no information in said substrate structure is read by any information reading apparatus; and a cover layer over said additional information layer, wherein said additional information layer has an information capacity of 23 GB or more, and comprises an information track having at least one of (A) pits with a minimum length along the track in a range of 138 nm to 160 nm, and (B) information marks configured for reading using a laser with a wavelength in a range of 400 nm to 420 nm and a numerical aperture of 0.85 from a direction opposite a read side of said substrate structure.

12. The optical storage medium in accordance with claim 11, wherein said adhesive layer is formed of light-curable resin.

13. The optical storage medium in accordance with claim 11, wherein said cover layer has a thickness of approximately 0.1 mm or less.

14. The optical storage medium in accordance with claim 11, further comprising:

a further high-density information layer between said cover layer and said additional information layer, said further high-density information layer including a semi-reflective film and comprising at least one of (i) pits with a minimum length along the track in a range of 138 nm to 160 nm, and (ii) information marks configured for reading using a laser with a wavelength in a range of 400 nm to 420 nm and a numerical aperture of 0.85; and a space layer between said additional information layer and said further high-density information layer, said space layer being formed of light-curable resin.

15. The optical storage medium in accordance with claim 14, wherein a transmission stack including said cover layer, said further high-density information layer, said space layer and said additional information layer has a thickness of approximately 0.1 mm.

16. The optical storage medium in accordance with claim 11, wherein said one or more information layers includes at least one information layer having information capacity of 15 GB or more.

17. The optical storage medium in accordance with claim 11, wherein said one or more information layers includes at least one information layer comprising at least one of (1) an information track comprising pits having a minimum length of approximately 204 nm, and (2) information marks configured for reading using a laser with a wavelength in a range of 400 nm to 420 nm and a numerical aperture of 0.65.

18. The optical storage medium in accordance with claim 11, wherein said one or more information layers includes at least one information layer having an information track comprising pits having a minimum length in a range of 400 nm to 440 nm.

19. The optical storage medium in accordance with claim 11, wherein said one or more information layers includes at least one information layer comprising information marks configured for reading using a laser with a wavelength in a range of 635 nm to 660 nm and a numerical aperture of 0.6.

20. A method for manufacturing an optical recording medium including a high-density information layer, said method comprising the steps of:

(a) forming a first substrate structure including a first substrate having a first surface including a pattern of pits and lands thereon and a reflective film over said first surface of said first substrate, said first substrate being formed of a material that does not bond well with said reflective film;

(b) forming a second substrate structure having a thickness of 1.0 mm or more and including one or more information layers, said second substrate structure further including a non-read read side from which information in the second substrate structure is not read and a read side from which said information in the second substrate structure is read, wherein said one or more information layers are separated from said read side of said second substrate structure by a spacing of approximately 0.6 mm;

(c) depositing an adhesive layer on said non-read side of said second substrate structure;

(d) bonding said first substrate structure and said second substrate structure together, with said first surface of said first substrate structure including said pattern of pits and lands thereon over which said reflective film is formed adhering via the adhesive to the non-read side of said second substrate structure;

(e) separating said first substrate from said second substrate structure, with said reflective film remaining adhered to said second substrate structure as an additional information layer, said additional information layer remaining adhered to said second substrate structure having information capacity of 23 GB or more and comprising an information track having pits with a minimum length along the track in a range of 138 nm to 160 nm, and information marks configured for reading using a laser with a wavelength in a range of 400 nm to 420 nm and a numerical aperture of 0.85 from a direction opposite said read side of said second substrate structure; and (f) forming a cover layer over said reflective film.

* * * * *